United States Patent [19]

Garrison, Jr. et al.

[11] 4,394,150
[45] Jul. 19, 1983

[54] SULPHUR-CLAY PRILLS

[75] Inventors: Barney D. Garrison, Jr.; Barry S. Marjanovich, both of Calgary, Canada

[73] Assignee: Canadian Superior Oil Ltd., Calgary, Canada

[21] Appl. No.: 229,642

[22] Filed: Jan. 29, 1981

[30] Foreign Application Priority Data

Feb. 29, 1980 [CA] Canada ............................ 346710

[51] Int. Cl.³ ............................................. C05G 3/04
[52] U.S. Cl. ...................................... 71/62; 71/64.11; 71/903; 71/904; 106/287.32
[58] Field of Search ..................... 71/1, 11, 27, 31, 32, 71/54, 62, 64.06, 64.11, 64.13, 903, 904; 106/DIG. 4, 287 SC; 264/13–15

[56] References Cited

U.S. PATENT DOCUMENTS 1,378,084  5/1921  Bacon et al.
3,840,232  10/1974  Ludwig et al.
4,133,669  1/1979  Caldwell et al.

FOREIGN PATENT DOCUMENTS 863221  2/1971  Canada.
1054821  5/1979  Canada.

OTHER PUBLICATIONS

NFSA, Liquid Fertilizer Manual, 1967, pp. 9-2, 9-3.

Primary Examiner—Ferris H. Lander
Attorney, Agent, or Firm—Bachman and LaPointe

[57] ABSTRACT

Substantially spherical, water-degradable, sulphur clay particles or prills are provided; the particles are formed by passing a mixture of molten sulphur and a particulate swelling clay through a plurality of orifices and into an aqueous solution of a water soluble electrolyte salt, maintained at a temperature effective to cool the mixture below its solidification temperature. An improved apparatus is also provided in which a high constant static head of molten material is let down to a low static head whereby molten material at low velocity falls under gravity into the aqueous electrolyte salt solution.

26 Claims, 2 Drawing Figures

4,394,150

SULPHUR-CLAY PRILLS

BACKGROUND OF THE INVENTION (i) Field of the Invention

This invention is concerned with prills and their manufacture, more especially the invention is concerned with a water-degradable sulphur prill and its manufacture and with an apparatus which can be used for such manufacture.

(ii) Description of the Prior Art

Sulphur is widely employed as a fertilizer or soil nutrient, since sulphur is essential to plant life and in many areas the soil must be supplemented with sulphur. In alkaline soils, addition of sulphur is desirable to increase soil water intake and aeration, improve the physical condition of the soil, eliminate harmful alkalinity and sodium problems and increase the availability to the plant of elements in the soil necessary for plant life.

Use of sulphur results in improvement in both yield and quality of the crop.

Sulphur is most suitably employed in elemental form and different processes have been proposed for providing sulphur in a form for use as a fertilizer.

Canadian Patent No. 1,054,821, Bob L. Caldwell, issued May 22, 1979, describes a method of producing granular sulphur-bentonite mixture for use as a fertilizer in which a uniform mixture of molten sulphur and bentonite is poured onto a wet thermally conductive metal plate and is allowed to cool to a thickness of 0.25 to 2 inches whereafter the solid is comminuted to provide granules. In U.S. Pat. No. 4,133,669, Bob L. Caldwell et al, issued Jan. 9, 1979, there is described a method of producing a water-degradable solid pellet of bentonite and elemental sulphur in which droplets of a mixture of molten sulphur are allowed to fall into a liquid fertilizer solution to anneal the droplets into pellets. An aqueous liquid fertilizer solution of low water content is used because the sulphur-bentonite mixture does not pelletize in water but rather degrades.

These prior processes, although producing acceptable water-degradable fertilizer products, have certain disadvantages. The granular product produced in accordance with Canadian Patent No. 1,054,821 comprises non-spherical particles of irregular shape having a non-smooth surface. The granules thus have a greater volume when packed for transport than would corresponding spherical particles and thus the transportation costs are higher than they would be for spherical particles. The non-smooth surface of the irregular shaped granules is friable such that the granular product has an undesirable content of fine particles or dust which is herein referred to as "fines". These fines are produced during the manufacture reducing the efficiency of yield of granular product and during subsequent storage, transportation and use of the granular product, particularly when the product is mobile and individual granules rub against each other. The fines are particularly undesirable in that during processing and use of the granules, clouds of dust may be generated in the air which is unpleasant for workers and may be hazardous to health; under certain circumstances there is also a danger of explosion.

In addition the irregular surfaces of the granular product renders the product susceptible to degradation at the surface on exposure to a humid environment, such that the product cannot be stored for long periods and also some degradation may occur during transport.

The pellets of U.S. Pat. No. 4,133,669 are allegedly dust-free, a nitrogen coating on the pellet retarding escape of dust from the pellet, however, the process of manufacture requires the use of a large volume of expensive nitrogen-containing liquid fertilizer to anneal the molten droplets and form the coating. A less costly aqueous annealing medium would be economically advantageous. In addition the pellets formed are not spherical, because the molten droplets are first formed in an air space below a perforation plate, whereafter the preformed droplets fall through the air under gravity into the liquid fertilizer. This results in spheroidal rather than spherical particles, the particles being flattened or oblate spheroids, and such spheroidal particles occupy a larger volume when packed and are thus more costly in storage and transport.

It is an object of the present invention to provide a water-degradable, substantially spherical particle having a hard, smooth surface, for use as a fertilizer.

It is a further object of the invention to provide an improved process for producing a water-degradable sulphur clay particle for use as a fertilizer.

It is a still further object of the invention to provide an improved process for producing water-degradable sulphur-clay prills for use as a fertilizer.

It is yet another object of the invention to provide a method of forming solid, substantially spherical particles from a molten, solidifiable material.

It is still yet another object of the invention to provide an apparatus for forming solid particles and prills from molten, solidifiable material.

The invention also has as an object to provide a prilling head for producing a solid prill from molten material.

SUMMARY OF THE INVENTION

According to one aspect of the invention there is provided a substantially spherical storage stable sulphur-clay particle having a smooth, hard surface, comprising sulphur and a swelling clay, said clay being present in an amount effective to render said particle water degradable.

In another aspect of the invention there is provided a process for producing water degradable, sulphur-clay particles comprising: passing a mixture comprising molten sulphur and a particulate swelling clay into an aqueous solution of a water soluble electrolyte salt, maintaining said solution at a temperature effective to cool said mixture below its solidification temperature, allowing said mixture to solidify into sulphur-clay particles in said solution, withdrawing said particles from said solution and drying said particles.

In yet another aspect of the invention there is provided an apparatus for producing a solid particle from a molten, solidifiable material which comprises a deep holding tank adapted to maintain a high constant static head of the molten material, the holding tank having a floor with a first plurality of orifices therein, and a shallow forming tray disposed below said holding tank adapted to maintain a low constant static head of molten material, the forming tank having a floor with a second plurality of circular orifices therein, the second plurality being greater than the first plurality, the total cross-sectional area of the second plurality being greater than the total cross-sectional area of the first plurality, the cross-sectional area of individual orifices of the second plurality being smaller than that of individual orifices of the first plurality such that continuous small diameter streams of molten material, of low velocity can be formed in said second plurality of orifices.

In still another aspect of the invention there is provided a prilling head for producing a solid prill from molten material comprising: a support frame, a deep holding tank for molten material mounted in an upper part of said frame, said holding tank having a tank floor with a plurality of feed orifices therethrough, a shallow distribution tray disposed below said tank floor in said frame, said tray having a tray floor with a plurality of distribution orifices therethrough, and a shallow forming tray disposed below said distribution tray floor in said frame, said forming tray having a forming tray floor with a plurality of circular forming orifices adapted to discharge continuous molten streams of the molten material.

DETAILED DESCRIPTION OF THE INVENTION AND PREFERRED EMBODIMENTS THEREOF

Process of Producing Particles

The solid particles are formed by cooling droplets of molten sulphur containing the swelling clay in an aqueous solution of a water soluble electrolyte salt.

In an especially preferred embodiment a mixture comprising molten sulphur and a particulate swelling clay is allowed to flow under gravity through a plurality of spaced apart circular prilling orifices to form a plurality of liquid streams, which are generally circular in cross-section such that the streams can be considered as being generally cylindrical continuous streams.

The liquid streams enter the aqueous solution of the electrolyte salt which causes the molten streams to break up because of the surface tension of the liquid sulphur, and form substantially spherical droplets which cool and solidify, while falling through the aqueous solution, to substantially spherical particles or prills.

During free fall through the aqueous solution or under minimal disruptive forces, surface tension causes the liquid sulphur to assume its equilibrium shape, namely a spherical droplet, having a lesser surface area per unit volume than any other shape.

It is believed that the ions of the electrolyte salt dissolved in the water forming the aqueous solution may interact with the strongly dipolar water molecules to reduce the water adsorption at the droplet surface.

In prilling the mixture, the disruptive forces working against the surface tension which tends to form truly spherical droplets, are the impact force of the stream against the surface of the solution and the drag force exerted on the droplets during settling and solidifying in the solution.

The impact force and the drag force are directly proportional to the squared product of the velocity and the diameter of the stream or droplet, and may become excessively large with relatively small increases in velocity and diameter, thereby disturbing the spherical shape.

Moreover, since the surface tension force is inversely proportional to the diameter of the stream or droplet, smaller diameter or thinner streams at lower velocities will minimize the disruptive forces and maximize the effect of the surface tension forces favouring the formation of spherical droplets and thus solid, spherical particles or prills.

The temperature of the molten mixture and the temperature of the aqueous solution are also significant in the prill formation.

Since the surfact tension of both liquids decreases with increase in temperature, spherical droplet and prill formation is favoured by employing the molten mixture at lower rather than higher temperatures and by employing the aqueous solution at higher rather than lower temperatures.

Thus the temperature of the molten mixture and of the aqueous solution, the orifice diameter and the velocity of the streams must all be considered in producing spherical particles.

The sulphur-clay mixture is suitably formed by slowly adding the particulate clay to molten sulphur which is suitably at a temperature of 250° F. to 270° F. A temperature of 250° F. and 260° F. is especially preferred for prilling. The mixture is continuously stirred, while maintaining the temperature in the indicated range to form a uniform mixture. Balling of the clay is avoided by stirring the mixture slowly.

The aqueous solution is maintained at a temperature effective to cool the molten material below its solidification temperature.

In addition it is appropriate to maintain the solution in an essentially quiescent state this is achieved by maintaining the temperature below the boiling temperature of the solution. If the solution boils or is close to the boiling point, the internal movement of the solution caused by bubbling disturbs the formation of spherical droplets and prills.

In particular it is found that if the aqueous solution is maintained at a temperature of 140° F. to 170° F., good prill formation is obtained.

As indicated above the diameter of the streams is significant in obtaining good prill formation. It is found that circular prilling orifices having a diameter of 1/16 to 3/32 inches results in good prill formation. It is appropriate to have the streams spaced spart to avoid coalescence between adjacent streams and between droplets of adjacent streams, to this end it is appropriate to space the orifices at least ¾ inches apart.

The velocity of the streams is determined by the head of the mixture retained over the prilling orifices and the distance from the orifices to the surface of the aqueous solution below.

The preferred apparatus of the invention maintains a constant head of mixture of only small depth above the orifices and the orifices are suitably spaced from 2 to 6 inches from the surface of the aqueous solution below.

The water soluble electrolyte salt in the aqueous solution is suitably employed in a dissolved concentration of about 5 to about 15%. The minimum dissolved concentration for effective prill formation without water-degradation appears to be about 5%. It is desirable not to employ concentrations in excess of about 15%, higher concentrations are unnecessary, and have the disadvantage that they cause excessive salt deposits on the prill surface, making the prills sticky and difficult to dry.

The electrolyte salt should be soluble in water, at least in an amount of 5%, by weight, at the solution temperature employed.

The electrolyte salt is preferably a strong electrolyte that is highly dissociated into its ions even at moderate dilutions and does not obey Ostwald's dilution law. Especially preferred are inorganic salts which are strong electrolytes, by way of example, there may be mentioned the water soluble halides, sulphates, nitrates, carbonates, phosphates and polyphosphates of potassium, sodium, calcium and ammonium. As the halides there may be mentioned in particular the chlorides.

It is appropriate to avoid the use of salts which are hazardous as being toxic, corrosive or explosive or otherwise hazardous to health even though they can be successfully used to produce good prills. It is also appropriate to avoid salts which have a tendency to foam as this will disturb the desired quiescent state of the solution. Finally, it is appropriate to avoid salts that are detrimental to plant life or the environment. Since some salt may be entrained in the prills during their formation and subsequently retained, it is especially appropriate to employ salts which are beneficial to plant life or to the soil or in any event which are agronomically, agriculturally and horticulturally acceptable.

As examples of salts which are preferably avoided there may be mentioned potassium nitrate and ammonium nitrate which are both explosive. Ammonium nitrate can, however, be stabilized by urea and used as a salt in the invention.

As examples of suitable electrolyte salts there may be mentioned ammonium sulphate, potassium chloride, potassium sulphate, potassium carbonate, potassium phosphate, sodium chloride, calcium chloride and ammonium polyphosphate.

The electrolyte salt may comprise a mixture of two or more salts so long as they do not react with each other in a deleterious manner.

The particulate swelling clay is employed in admixture with the molten sulphur in an amount to provide a swelling clay content in the prills effective to render the prills water-degradable.

The minimum effective content of the swelling clay is about 7% by weight of the prills. If the amount of swelling clay in the admixture with the molten sulphur is too high it becomes difficult to form the prills. Suitably the upper limit for the swelling clay content of the prills is about 12% by weight.

Since some swelling clay is lost in the aqueous solution during processing, the amount of swelling clay added to the molten sulphur should be higher than the desired swelling clay content of the prill. In general the swelling clay content of the molten mixture should be 1 or 2% higher than the desired clay content of the prill; in particular for a prill containing, in weight %, 90% sulphur and 10% swelling clay it is appropriate to employ a molten mixture comprising, in weight %, 88 to 89% sulphur and 11 to 12% swelling clay to a total of 100%.

The formed prills are removed from the aqueous solution and dewatered, suitably by means of an inclined tray-type conveyor which transports the prills from the forming tank containing the solution, to a dryer. The conveyor trays comprise mesh wire screens which allow free water and fines to pass through the flow back into the forming tank. Swelling clay fines and product fines are suitably recovered from the aqueous solution through a filtering system.

The prills have a content of fines as prilled of about 0.1 to about 0.8%, by weight, on a −50 U.S. sieve.

The prills, before drying, typically have a surface moisture content, in weight %, of about 3 to about 5% and are dried to a surface moisture content of 0 to about 1.5%, suitably in a rotary hot air dryer. Prills with a surface moisture content up to about 1.5% can be stored without caking or degradation. Some internal water is retained during the drying. Depending on the narrowness of size range desired in the product prills, the dry prills can be screened to remove oversized and smaller particle sized prills, whereafter the removed prills can be recycled to the molten mixture.

Prills

The substantially spherical water-degradable particles of the invention are, in this specification, referred to as "prills", which term is intended to exclude non-spherical particles such as the irregular shaped granules of the afore-mentioned Canadian Patent No. 1,054,821 and the spheroidal particles of U.S. Pat. No. 4,133,669.

The novel prill of the invention consists essentially of elemental sulphur and a swelling clay and may additionally include trace amounts of electrolyte salt and water.

In particular the prills consist essentially of about 88 to about 93% of sulphur and about 7 to about 12% of swelling clay, and preferably contain about 89 to about 90% of sulphur and about 9 to about 10% of swelling clay.

The swelling clay is a clay mineral which adsorbs or takes up water and swells. In use the prills adsorb moisture from the environment, for example, the soil or the atmosphere, and swell. The swelling brings about the disintegration of the prills to provide particles of sulphur in a finely divided form, in the soil.

Clay minerals are layer-lattices minerals and are basically hydrous aluminium silicates or hydrous magnesium silicates, however, not all clays are capable of interlayer swelling. The smectite group which is also known as the montmorillonite group and which includes montmorillonite, nontronite and beidellite, is especially notable for its swelling capacity in water. A preferred swelling clay for the prills of the invention is bentonite which is composed largely of montmorillonite and beidellite.

In particular bentonite occurs in a sodium form, sodium bentonite, and a calcium form, calcium bentonite. Sodium bentonite has a high swelling capacity in water and has strong adsorbing properties, more specifically sodium bentonite may swell 12-fold when contacted with water. Calcium bentonite, on the other hand, has a negligible swelling capacity.

The bentonite employed in this invention must therefore include the sodium form. A mixture of the sodium and calcium forms can be used, especially when both forms are present in the source of the material, but it is the sodium form that is active in the degradation of the prills in use.

The swelling clay should be in a relatively fine powder form, and it is found especially appropriate to employ a clay having a particle size of +325 to −200 mesh (U.S. sieve).

The prills of the invention display excellent storage stability, and experimental samples of the prills have been stored for up to a year under normal variation of ambient atmospheric temperature and humidity, without showing any deterioration.

The prills, however, degrade or disintegrate into finely divided particles within four hours of being completely immersed in pure distilled water.

The prills of the invention suitably have a prill size of +16 to −4 mesh (U.S. sieve) and a loose bulk density of about 70 to about 85 lb/ft$^3$.

The prills have a hard, smooth surface and display low friability. Prills of the invention were tested for friability according to the sulphur prill testing procedure S5-77 developed by the Sulphur Development Institute of Canada (SUDIC), Calgary, Alberta, Canada. In this test prills are tumbled in a 28 inch diameter cylinder rotated at a speed of 31±1 RPM for a total of 40 revolutions. The test measures prill degradation or the amount of fines which would be generated by field handling and transportation. The prills of the invention have a friability in terms of the percent fines generated in this test of about 2 to about 5% (−50 U.S. sieve size) and more particularly about 2.5 to 2.75%, specifically about 2.6%, with the overall prill breakdown being about 3.5 to 4%, particularly about 3.8%.

The low friability and stable storage characteristics of the prills are also demonstrated by the fact that only about 0.1 to about 0.5% fines are generated when the prills are stockpiled to a height of 50 ft.

The prills of the invention are further characterized by an angle of repose of about 25° to 35°; the angle of repose being the angle of maximum slope at which a pile of the prills will stand, without sliding.

The novel prills typically have an internal moisture content, in weight %, of about 0.02 to 0.1 and a surface moisture, after drying of, in weight %, 0 to 1.5%.

Apparatus

The prills of the invention may be produced in an apparatus adapted from that described in Canadian Pat. No. 863,221, Roy E. Campbell, issued Feb. 9, 1971, for producing sulphur prills. In particular the apparatus described therein would require modification to provide a mixing tank to maintain a supply of uniformly mixed molten sulphur and particulate swelling clay.

Water-degradable particles can also be produced employing the apparatus described in the afore-mentioned U.S. Pat. No. 4,133,669, employing an aqueous solution of an electrolyte salt in accordance with this invention rather than the nitrogen-containing liquid fertilizer. The particles produced will not have the advantages of the novel prills of the invention, which are substantially spherical, nevertheless the spheroidal particles produced represent an acceptable commercial product produced more economically than in the system in the U.S. patent in view of the lower cost of maintaining the aqueous solution of the invention as compared with the nitrogen-containing liquid fertilizer.

However, the prior apparatus described in the U.S. patent and the apparatus adapted from the apparatus described in the Canadian patent are less preferred.

The apparatus of the Canadian patent includes a holding tank to maintain a constant level of molten material to be prilled. The apparatus is such that a fairly deep static head of molten material is maintained. The depth or level of the static head of molten material on the forming orifices which discharge the molten stream under gravity is a factor in successful prill formation as well as prill size.

In order to form spherical particles it is necessary that the streams be thin, that is of small diameter, and that they have a low velocity. The deep static head provided by the apparatus in the Canadian patent dictates against these features. The velocity is a function of both the orifice size and the height or depth of the static head and the depth of static head required in the apparatus of the Canadian patent, for a particular orifice size to produce a particular prill size, results in streams of relatively high velocity, thereby causing deviation in the prills formed, from the desired spherical shape.

The apparatus of the invention is adapted to maintain a low static head of molten material over the prilling orifices and permits the formation of low velocity streams even with orifices of relatively large diameter.

In particular in the apparatus of the invention most of the molten material is maintained in a holding tank and is fed under gravity to a distribution tray below it, which in turn distributes the molten material under gravity to a forming tray below it. Both the distribution tray and the forming tray are dimensioned to maintain a much lower static head of molten material than the holding tank. In addition the forming tray is dimensioned to maintain a lower static head of molten material than the distribution tray.

The individual orifices in the floor of the holding tank, distribution tray and forming tray decrease in cross-sectional area from the holding tank to the forming tray although the number of orifices and the total area of the orifices increases from the holding tank to the forming tray.

In this way the molten material is delivered from the holding tank to the forming tray in a stepwise manner, the velocity of the molten material decreases from the holding tank to the forming tray, and only a small static head of molten material, determining the velocity of the streams through the prilling orifices is maintained.

BRIEF DESCRIPTION OF THE DRAWINGS

The invention is further illustrated in a preferred embodiment by reference to the accompanying drawings in which.

DESCRIPTION OF THE PREFERRED EMBODIMENTS BY REFERENCE TO THE DRAWINGS

Figure 1:
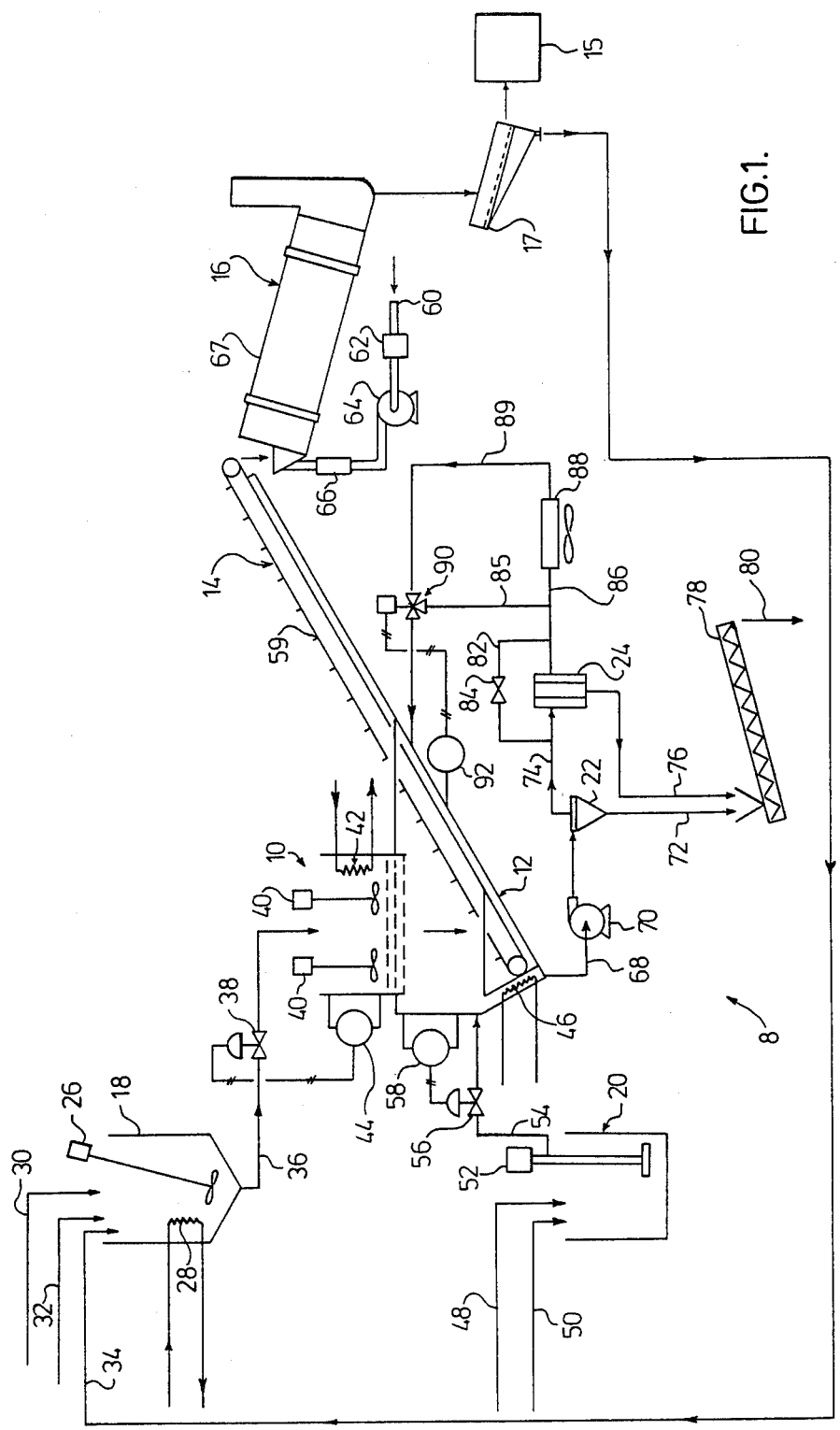
FIG. 1 is a schematic representation of an apparatus for producing prills in accordance with the invention.

With further reference to the drawings a prill forming apparatus 8 comprises a prilling head 10, a forming tank 12, a dewatering tray conveyor 14, a rotary dryer 16, a screen 17, and a storage container 15. The apparatus 8 further includes a mixing tank 18, a solution tank 20, a cyclone separator 22 and a filter 24.

Mixing tank 18 includes a mixer 26 for mixing particulate swelling clay and molten sulphur, a steam heater 28 to maintain the sulphur in a molten state, a swelling clay inlet line 30, a molten sulphur inlet line 32 and a recycle inlet line 34.

A molten mixture line 36 delivers molten material from the mixing tank 18 to the prilling head 10.

A metering valve 38 in line 36 is controlled by a level control 44 to maintain a constant head of the molten mixture in the prilling head 10.

Prilling head 10 includes mixers 40 to maintain the molten mixture uniformly mixed and a steam heater 42 to maintain the temperature of the molten mixture.

Forming tank 12 includes a steam heater 46 to maintain the temperature of the aqueous electrolyte solution therein.

Solution tank 20 includes a water inlet line 48 and an electrolyte salt inlet line 50. A pump 52 delivers solution from tank 20 through a solution line 54 to forming tank 12. A valve 56 in solution line 54 is controlled by a level control 58 to maintain a constant level of solution in forming tank 12.

The dewatering conveyor 14 is inclined with its lower portion submerged in the solution in forming tank 12. Conveyor 14 comprises a plurality of trays 59 for collecting formed prills and a return chute 57. The trays 59 suitably comprise mesh wire screens.

The rotary dryer 16 comprises an air inlet 60, an air filter 62, an air blower 64, a heater 66 and a rotary drum 67.

A slurry line 68 from the bottom of forming tank 12 communicates with cyclone separator 22 through a slurry pump 70.

A heavy particle line 72 from cyclone separator 22 communicates with screw conveyor 78.

A light particle line 74 from cyclone separator 22 delivers undissolved fine particles and electrolyte salt solution to filter 24. The undissolved fine particles collected in filter 24 are delivered via a filter particle line 76 to screw conveyor 78.

Electrolyte salt solution is returned from filter 24 to forming tank 12 through a tank recycle line 85. A first portion of the solution in line 85 is returned to line 74 through filter recycle line 82 having a valve 84 therein.

A second portion of the solution in line 85 is taken through cooler line 86 to a cooler 88 where it is cooled, and from there to a cooled solution line 89.

Lines 85 and 89 meet at a valve 90 which is controlled by a temperature control 92.

The swelling clay and fine particles in conveyor 78 are removed by a disposal line 80. Optionally line 80 may be connected to line 30.

The prills from dryer 16 are screened on screen 17 to provide prills of a desired size, which are then passed to the storage container 15. Fines and oversized prills are recycled through line 34 to mixing tank 18.

Figure 2:
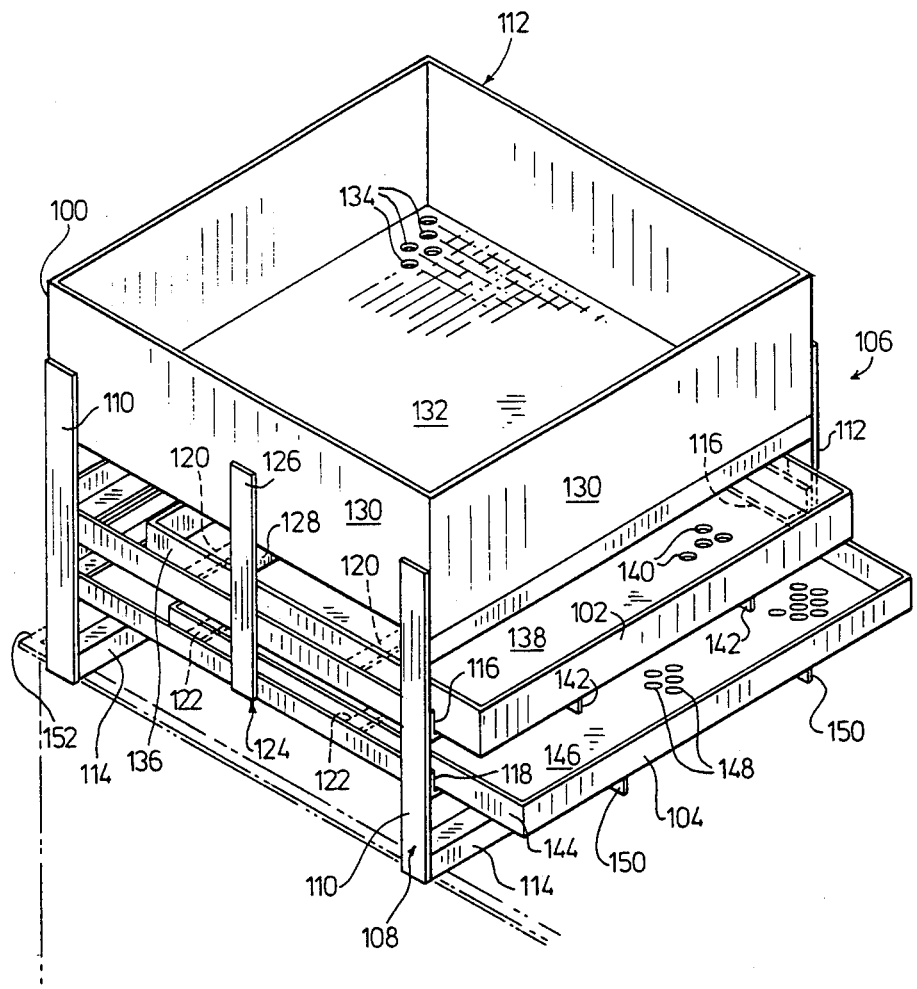
FIG. 2 is an isometric view of an improved prilling head which forms part of the apparatus of the invention.

With reference to FIG. 2 there is shown a prilling head 10 for use in the apparatus 8 of FIG. 1.

Prilling head 10 comprises a holding tank 100, a distribution tray 102 and a forming tray 104 mounted in a supporting frame 106.

Supporting frame 106 comprises a pair of U-shaped side supports 108, each support 108 comprising a pair of vertical legs 110 and 112 connected by a horizontal arm 114.

A pair of L-shaped supports 116 is mounted between legs 110 and between legs 112 respectively.

A second pair of L-shaped supports 118 is similarly mounted between legs 110 and between legs 112 respectively, below L-shaped supports 116.

Struts 120 extend between the supports 116, and are secured to the bottom thereof. Struts 122 extend between the supports 118 and are similarly secured to the bottom thereof.

An H-shaped support 124 is disposed intermediate side supports 108 and includes a pair of vertical legs 126 connected by an arm 128.

The legs 126 of support 124 are secured at an inner surface to the upright outer surfaces of supports 116 and 118, with arm 128 above supports 116.

Holding tank 100 is mounted on arm 128 and is secured to the upper ends of legs 110 and 112.

Holding tank 100 includes walls 130 and a floor 132. A plurality of circular orifices 134 is formed in floor 132, in spaced apart rows.

Distribution tray 102 comprises walls 136 and floor 138 and is slidably mounted on the upper horizontal portions of supports 116. A pair of elongated feet 142 extend from the underside of floor 138 to support tray 102 on the struts 116.

A plurality of circular orifices 140 is formed, in spaced apart rows, in floor 138.

Forming tray 104 comprises walls 144 and a floor 146, and is slidably mounted on the upper horizontal portions of supports 118. A pair of elongated feet 150 on the underside of floor 146 supports tray 104 on struts 122.

A plurality of circular orifices 148 is formed in spaced apart rows in floor 146.

Side supports 108 mount the prilling head 10 across opposed upper edges 152 of forming tank 112.

The number of orifices 140 is greater than the number of orifices 134 and the number of orifices 148 is greater than the number of orifices 140.

The diameter of orifices 140 is less than that of orifices 134 and the diameter of orifices 148 is less than that of orifices 140. The total cross-sectional area of orifices 140 is greater than the total cross-sectional area of orifices 134; and the total cross-sectional area of orifices 148 is greater than the total cross-sectional area of orifices 140.

Trays 102 and 104 are, as indicated above slidably mounted in frame 106. In this way trays 102 and 104 can be readily removed from frame 106 for cleaning.

The operation is described with further reference to the drawings, swelling clay and molten sulphur are delivered to mixing tank 18 through lines 30 and 32 respectively, where they are continuously stirred by mixer 26 to produce a uniform mixture, at a controlled temperature maintained by heater 28.

The mixture is metered from tank 18 through line 36 and metering valve 38 to the holding tank 100 (FIG. 2) of prilling head 10. The metering of the mixture is controlled by the level control 44 to maintain a constant static head of the mixture in holding tank 100.

The mixture is continuously stirred in holding tank 100 by mixers 40, the temperature being maintained by heater 42.

With particular reference to FIG. 2, the mixture in holding tank 100 passes through orifices 134 into the distribution tray 102 and through the orifices 140 into forming tray 104.

Forming tray 104 provides a significantly smaller static head of molten material than does holding tank 100. Molten material passes through the circular orifices 148 in the floor 146 of forming tray 104, in continuous streams, and the continuous streams enter the aqueous electrolyte salt solution in forming tank 12, the temperature of the solution being maintained by heater 46.

The solution is maintained at a constant level below the floor 146 of forming tray 104 by the level control 58.

As the streams of molten material are submerged in the solution in the forming tank 12, they are broken up into substantially spherical droplets which solidify in the solution as they fall therethrough towards the bottom of the tank 12.

The bottom of the tank 12 is suitably sloped and the formed prills are collected on the trays 59 of conveyor 14. As the trays 59 emerge from the tank 12 water is drained from the trays 59 into return chute 57 and returned thereby to the tank 12.

The dewatered prills which still contain residual water are dried by means of hot air in rotary dryer 16 which is of a conventional form.

The dried prills from dryer 16 can be stored as such or screened by means of screen 17 to obtain a desired prill size. Fines and oversized prills from screen 17 are returned to mixer 18 via line 34.

Slurry accumulating in the bottom of tank 12 is pumped by slurry pump 70 through slurry line 68 to the cyclone separator 22, where the heavier particles are separated and removed through line 72 to screw conveyor 78. The lighter undissolved particles and salt solution from cyclone 22 are passed through line 74 to filter 24. The undissolved fine particles are collected in filter 24 and are passed to the screw conveyor 78 through line 76. The salt solution from filter 24 is returned to forming tank 12 through recycle line 85.

A first portion of the salt solution in line 85 is returned to line 74 for refiltering in filter 24 via line 82 and valve 84.

A second portion of salt solution in line 85 is bled-off through a cooler line 86 to a cooler 88, the resulting cooled solution being returned to line 85 through line 89.

The relative proportions of solution in lines 85 and 89 which are fed into tank 12 are controlled by valve 90 in response to temperature control 92, so that the solution in tank 12 is maintained at a desired temperature.

The particulate material in screw conveyor 78 is removed through line 80 and can be recycled to the tank 18.

The prilling head 10, while maintaining a constant high static head of material in holding tank 100 suitable for a continuous operation, delivers continuous streams of the molten material at low velocity to the forming tank 12. This is achieved by the step down of the head of molten material in tank 100, by means of the distribution tray 102, so that a lower head is formed in tray 102, and a still lower head in tray 104.

The low static head of molten material in tray 104 produces continuous streams of the molten material of low velocity.

The velocity of a molten material flowing downwardly through an orifice is determined by the head of molten material above the orifice. However, the orifice dimension also affects the velocity, a critical orifice dimension being reached, as the orifice dimension is decreased, at which point the orifice produces a drag in the flow and retards the flow thereby reducing the velocity of flow. The critical orifice dimension depends on the viscosity of the molten material.

In order to produce spherical particles it is necessary to produce continuous smaller diameter streams of the molten material at low velocity.

The prilling head 10 achieves this by a stepwise reduction of the orifice size from the tank 100, through tray 102 to tray 104. At the same time the total cross-sectional area of the orifices is increased, in a stepwise manner, by increasing the number of orifices from the tank 100, through tray 102 to tray 104 to compensate for the reduction in velocity of the molten material brought about by the lower static heads in each of trays 102 and 104, and the smaller orifice sizes in each of trays 102 and 104, as compared with tank 100.

The total orifice cross-sectional area in the distribution tray is about three times as large, and in the forming tray about nine times as large, as that in the holding tank. A constant liquid level needs to be maintained only in the holding tank. By virtue of the increased total orifice cross-sectional areas in the lower trays, constant but substantially lower liquid levels are established naturally in the lower trays.

By means of prilling head 10 it is possible to form a low static head below the high static head. The high static head typically having a depth of 40 to 50 and preferably about 45 times the depth of the low static head.

In general it is found appropriate to limit the depth of the low static head to not more than about 0.5 inches, and a low static head maintained at a depth in the range of about 0.1 to about 0.5 inches has been found especially useful.

It is found that at low static head depths greater than about 0.5 inches the prills formed begin to depart from the desired spherical shape.

EXAMPLE

In an example a prilling head 10 as shown in FIG. 2 was employed in the apparatus 8 of FIG. 1.

The holding tank 100, distribution tray 102 and forming tray 104 were of substantially square cross-section, measuring 6 ft. by 6 ft.

The holding tank 100 had a depth of 2 ft. and the floor 132 had 144 circular orifices 134, spaced 6 ins. apart, in rows, each orifice 134 having a diameter of 5/32 ins.

The distribution tray 102 had a depth of 4 ins. and the floor 138 has 1152 circular orifices 140, spaced 2 ins. apart, in rows, each orifice 140 having a diameter of 3/32 ins.

The forming tray 104 had a depth of 2 ins. and the floor 146 had 4700 circular orifices 148, spaced 1 in. apart, in rows, each orifice 148 having a diameter of 5/64 ins.

A molten mixture comprising 90% by weight of molten sulphur and 10% by weight of a particulate bentonite clay comprising a mixture of sodium bentonite and calcium bentonite, having a particle size ranging from −200 to +350 mesh (U.S. sieve), was maintained at a temperature of about 255° F. in tank 100, at a constant static head of 5.5 inches.

The static head formed in tray 104 was about ⅛".

The molten mixture was delivered from tray 104 in 4700 continuous streams into a 10% aqueous solution of potassium phosphate, at a temperature of 155° F., in a tank 12. The upper surface of the solution was at a level maintained 4 ins. below the orifices 148 of tray 104.

The prills formed in tank 12 were removed and dewatered by conveyor 14 having trays 59 comprising 12 mesh (U.S. sieve) screens.

The prills were dried in rotary dryer 16; the following prill size distribution was obtained:

| U.S. Sieve Size | Wt. % Retained |
|---|---|
| ⅜" | 0 |
| No. 4 | 1.2 |
| No. 5 | 28.4 |
| No. 6 | 43.5 |
| No. 7 | 21.5 |
| No. 8 | 4.7 |
| No. 12 | 0.6 |
| Minus No. 50 | 0.1 |
| | 100.00 |

In this run 98.7% of product was within the size range of 4 to +12 mesh.

The prills were substantially spherical particles having a hard, smooth surface and a friability of 2.6%, with an overall particle breakdown of 3.8% (testing procedure S5-77).

Each prill contained a pin hole extending from the prill surface into the core, this being generally characteristic of prills formed in liquid solutions.

We claim:

1. A process for producing substantially spherical, water degradable, sulphur-clay particles comprising:
passing at least one stream of a mixture comprising molten sulphur and a particulate swelling clay into an aqueous solution of a water soluble electrolyte salt, said solution comprising about 5 to 15%, by weight, of said salt and about 85 to 95%, by weight, of water, maintaining said solution at a temperature effective to cool said mixture below its solidification temperature, allowing the surface tension of the molten sulphur to break up said stream in said solution to form substantially spherical droplets and allowing said droplets to cool and solidify in said solution to form said substantially spherical particles,
withdrawing said particles from said solution and drying said particles.

2. A process according to claim 1, wherein said electrolyte salt is an inorganic salt.

3. A process according to claim 2, wherein said solution is maintained at a temperature of about 140° F. to about 170° F.

4. A process according to claim 3, wherein said swelling clay is present in said mixture in an amount effective to produce sulphur-clay particles containing about 7 to about 12%, by weight of said swelling clay.

5. A process according to claim 4, wherein said electrolyte salt is a water soluble halide, sulphate, nitrate, carbonate, phosphate or polyphosphate of potassium, sodium, calcium or ammonium.

6. A process according to claim 4, wherein said salt is a strong electrolyte which is agronomically, agriculturally and horticulturally acceptable.

7. A process according to claim 4, wherein said mixture of said stream is at a temperature of about 250° F. to about 270° F.

8. A process according to claim 1, wherein said swelling clay is present in said mixture in an amount effective to produce spherical sulphur-clay particles containing about 7 to about 12%, by weight of said swelling clay.

9. A process according to claim 8, wherein said electrolyte salt is a strong electrolyte.

10. A process for producing water-degradable, sulphur-clay prills comprising:
forming a high static head of a mixture comprising molten sulphur and a particulate swelling clay,
allowing said mixture to fall through a plurality of orifices to form a low static head of the mixture,
feeding the mixture in the low static head in a plurality of continuous streams of circular cross-section into an aqueous solution of a water soluble electrolyte salt, said solution comprising about 5 to 15%, by weight, of said salt and about 85 to 95%, by weight, of water and being maintained at a temperature effective to cool said mixture below its solidification temperature,
allowing the surface tension of the molten sulphur to break up said streams in said solution to form substantially spherical droplets and allowing said droplets to cool and solidify in said solution to form said prills,
withdrawing the prills from said solution and drying said prills, said swelling clay being present in said mixture in an amount to provide a content of clay in said prills effective to render the prills water degradable.

11. A process according to claim 10, wherein said salt is an inorganic salt in a concentration of about 5 to about 15%, by weight and said solution is maintained at a temperature of about 140° F. to about 170° F.

12. A process according to claim 11, wherein said mixture in said high static head is maintained at a temperature of about 250° F. to about 270° F.

13. A process according to claim 12, wherein said continuous streams have a diameter of 1/16 to 3/32 inches and said high static head has a depth from 40 to 50 times the depth of the low static head.

14. In a method of forming solid, substantially spherical particles from a molten, solidifiable material, comprising feeding the molten material in a plurality of continuous streams into a forming medium effective to cool said molten material below its solidification temperature to form solid, substantially spherical particles, the improvement wherein said molten material is allowed to fall from a constant high static head through a first plurality of orifices to form a constant low static head of said molten material above said forming medium, said low static head being vertically below said high static head, and allowing said molten material to fall through a second plurality of orifices from said constant low static head in said plurality of continuous streams into said forming medium, said high static head having a depth of 40 to 50 times the depth of the low static head.

15. A method according to claim 14, wherein said orifices of said second plurality have a diameter of 1/16 to 3/32 inches, and the individual orifices of said first plurality have a diameter greater than the orifices of the second plurality, the second plurality being greater than the first plurality such that the total cross-sectional area of orifices in the second plurality is greater than that in the first plurality.

16. A method according to claim 14, wherein said low static head has a depth of not more than about 0.5 inches.

17. A method according to claim 14, wherein said molten material is allowed to fall from said high static head to a distribution means in which a low static head of molten material is formed, said molten material being allowed to fall from said low static head in said distribution means through a third plurality of orifices to form said constant low static head above said forming medium, the low static head above said forming medium being lower than the low static head in said distribution means.

18. A method according to claim 17, wherein said constant low static head has a depth of about 0.1 to about 0.5 inches.

19. A method according to claim 14, wherein said molten material is allowed to fall from said high static head to a distribution means in which a low static head of molten material is formed, said molten material being allowed to fall from said low static head in said distribution means through a third plurality of orifices to form said constant low static head above said forming medium, the low static head above said forming medium being lower than the low static head in said distribution means; and said orifices of said second plurality have a diameter of 1/16 to 3/32 inches, and the individual orifices of said first plurality have a diameter greater than the orifices of the second plurality, the second plurality being greater than the first plurality such that the total cross-sectional area of orifices in the second plurality is greater than that in the first plurality; said orifices of said third plurality having a cross-sectional area smaller than the orifices of said first plurality and greater than the orifices of said second plurality, the total cross-sectional area of the orifices of said third plurality being greater than that of said first plurality and less than that of said second plurality.

20. A method according to claim 14, wherein said orifices of said second plurality have a diameter of 1/16 to 3/32 inches and are spaced at least ¾ inches apart, said constant low static head being maintained at a spacing of 2 to 6 inches from the surface of the forming medium.

21. A method according to claim 20, wherein said molten material is allowed to fall from said high static head to a distribution means in which a low static head of molten material is formed, said molten material being allowed to fall from said low static head in said distribution means through a third plurality of orifices to form said constant low static head above said forming medium, the low static head above said forming medium being lower than the low static head in said distribution means.

22. A process according to claim 10, wherein said high static head is a constant head and said mixture falls through said plurality of orifices said orifices defining a first plurality, to form a constant low static head of said molten material above said aqueous solution and said mixture is allowed to fall through a second plurality of orifices from said constant low static head in said plurality of continuous streams into said aqueous solution.

23. A method according to claim 22, wherein said high static head has a depth of 40 to 50 times the depth of said low static head.

24. A method according to claim 23, wherein said orifices of said second plurality have a diameter of 1/16 to 3/32 inches, and the individual orifices of said first plurality have a diameter greater than the orifices of the second plurality, the second plurality being greater than the first plurality such that the total cross-sectional area of orifices in the second plurality is greater than that in the first plurality.

25. A process according to claim 24, wherein said low static head has a depth of not more than about 0.5 inches and is maintained at a spacing of 2 to 6 inches from the surface of said aqueous solution.

26. A process for producing water-degradable, sulphur-clay prills comprising:

forming a high static head of a mixture comprising molten sulphur and a particulate swelling clay, said swelling clay being present in said mixture in an amount effective to produce sulphur-clay prills containing about 7 to 12%, by weight, of said swelling clay, allowing said mixture to fall from said high static head through a first plurality of orifices to a distribution means in which an intermediate static head is formed, said intermediate static head being vertically below said high static head, allowing said mixture to fall from said distribution means through a second plurality of orifices to form a low static head of the mixture at a temperature of about 250° F. to about 270° F., said low static head having a depth of not more than about 0.5 inches, and said high static head having a depth of 40 to 50 times the depth of the low static head, and said low static head being of lower depth than said intermediate static head, said low static head being vertically below said intermediate static head, allowing the mixture in the low static head to fall from the low static head through a third plurality of orifices in a plurality of continuous streams of circular cross-section into an aqueous solution of a water soluble, inorganic electrolyte salt, said solution having an upper surface spaced 2 to 6 inches below said low static head, and consisting essentially of about 5 to 15%, by weight, of said salt and about 85 to 95%, by weight, of water, said solution being maintained in a quiescent state at a temperature of about 140° F. to about 170° F., allowing the surface tension of the molten sulphur to break up said streams in said solution to form substantially spherical droplets, and allowing said droplets to cool and solidify in said solution to form prills, withdrawing the prills from said solution, drying said prills and recovering said prills as sulphur-clay prills having a smooth, hard, substantially spherical surface, and containing 88 to 93%, elemental sulphur and 7 to 12% swelling clay, in weight percent, with an internal moisture content, in weight percent of 0.02 to 0.17 and a surface moisture content of 0 to 1.5%, the orifices of said first plurality having a diameter greater than the orifices of said third plurality, the third plurality being greater than the first plurality such that the total cross sectional area of orifices in the third plurality is greater than in the first plurality, said orifices of said second plurality having a cross-sectional area smaller than the orifices of said first plurality and greater than the orifices of said third plurality, the total cross-sectional area of the orifices of said second plurality being greater than that of said first plurality and less than that of said third plurality, said orifices of said third plurality having a diameter of 1/16 to 3/32 inches and being spaced at least ¾ inches apart.

* * * * *